(No Model.)

W. H. GAILOR.
THILL COUPLING.

No. 421,565. Patented Feb. 18, 1890.

Witnesses:
J. P. Theo. Lang
E. T. Fenwick

Inventor:
Wm H. Gailor
by his Atty
Mason, Fenwick & Lawrence ated December 23, 1889. Serial No. 334,742. (No model.)

UNITED STATES PATENT OFFICE.

WILLIAM H. GAILOR, OF SARATOGA SPRINGS, NEW YORK, ASSIGNOR OF ONE-HALF TO EDGAR T. BRACKETT, OF SAME PLACE.

THILL-COUPLING.

SPECIFICATION forming part of Letters Patent No. 421,565, dated February 18, 1890.

Application filed December 23, 1889. Serial No. 334,742. (No model.)

*To all whom it may concern:*

Be it known that I, WILLIAM H. GAILOR, a citizen of the United States, residing at Saratoga Springs, in the county of Saratoga and State of New York, have invented certain new and useful Improvements in Connecting the Thills or Shafts of Vehicles to their Axles; and I do hereby declare the following to be a full, clear, and exact description of the invention, such as will enable others skilled in the art to which it appertains to make and use the same.

The main object of my invention is to provide improved means for connecting thills and poles of vehicles to their axle shackles or clips, whereby wear in the eye of the thill or pole iron, as well as the wear upon the connecting-bolt of the thill or pole iron, may be compensated for, and all rattling due to such wear obviated, while the parts may be readily tightened up and securely held against casual displacement.

Figure 1:
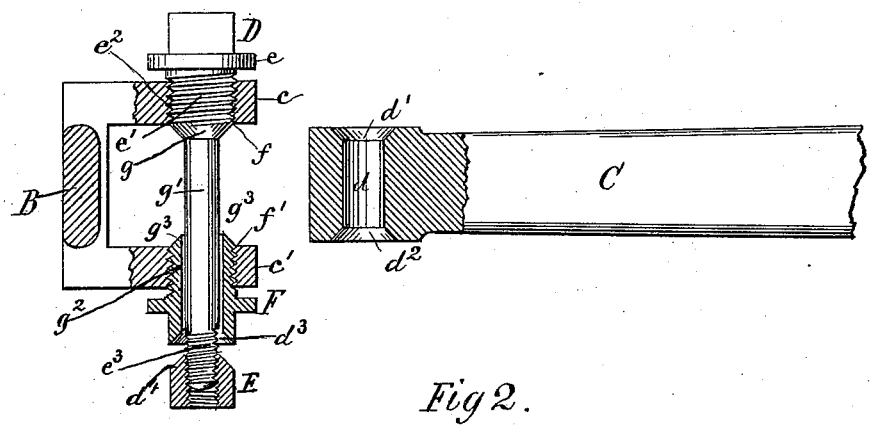
Figure 2:
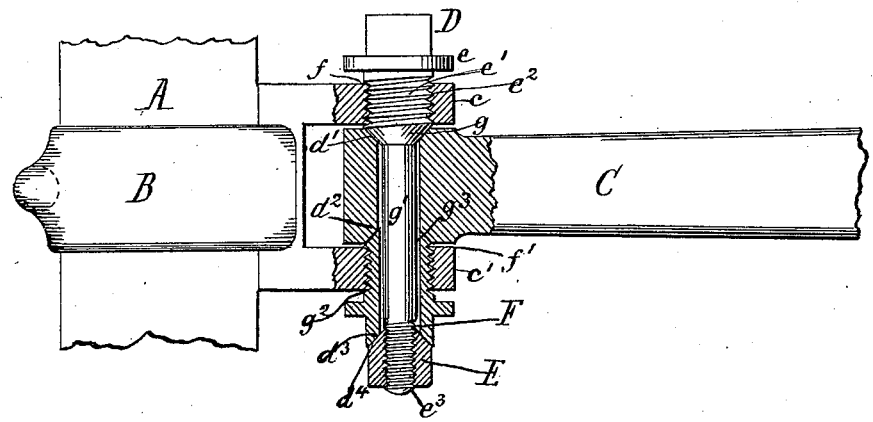

In the drawings, Figure 1 shows a thill-iron or goose-neck of a vehicle thill or shaft partly in plan view and partly in horizontal central section, this view showing the thill-iron detached from the clip, the connecting-bolt in place in the lugs or ears of the clip, with a bevel-end hollow screw-plug in place upon the body portion of the connecting-bolt. Fig. 2 indicates in plan view a portion of a vehicle-axle having a clip or shackle applied in the ordinary manner, and with the clip-lugs, the thill-iron, the hollow screw-threaded plug, and convex check-nut in section, as shown in Fig. 1, and with the several parts adjusted to their full extent in working position.

In the drawings, A indicates the axle with the clip B applied thereto in the ordinary manner, the view Fig. 1 showing the lugs $c\ c'$ partly in section.

C indicates the thill-iron or goose-neck of the thills of a vehicle, having a bolt-eye $d$ through its connecting end and beveled inwardly, as at $d'\ d^2$, in order to afford a frictional seat for the beveled portion of the connecting-bolt D and the hollow screw-threaded plug F when the same are in working action, as shown in Fig. 2.

D clearly represents the connecting-bolt of the clip and the thill-iron. Its head is made square, and beneath its annular flange $e$ it is provided with a male screw, as $e'$, to fit into a female screw $e^2$ in the bolt-eye $f$ of the lug $c$ when said bolt is in position, as shown. The male screw $e'$, as shown, terminates in a bevel portion $g$, and from such bevel portion the body $g'$ of the bolt is much reduced in diameter, and at its inner end is made screw-threaded, as at $e^3$, in order to have a convex check-nut, as E, screwed thereon, as represented in Fig. 2, for holding the parts in their adjusted position.

F is a hollow screw-threaded plug provided with a square head and with an annular concavity, as $d^3$, cut therein to form a broad friction-bevel $d^4$ of the check-nut E when screwed up into place, as in Fig. 2. The body portion $g^2$ of the plug is screw-threaded, as shown, in order to screw into an eye $f'$ through the lug $c'$, said eye being properly screw-threaded to receive said body portion $g^2$, while at its inner end it is beveled, as at $g^3$, in order to seat itself in the head $d^2$ of the thill-iron C when said iron is connected with the lugs $c\ c'$ of the clip B, as shown in Fig. 2. It will thus be seen that when the connecting-bolt D is in working position, as shown in Fig. 2, its bevel portion $g$ is made to enter the eye-bevel $d'$ of the thill-iron C, while at the same time the bevel $g^3$ of the screw-plug F is made to enter and more or less seat itself with a frictional impact in the eye-bevel $d^2$ of the thill-iron. Thus connected, as in Fig. 2, it will also be seen that by screwing up the bolt D its screw $e'$, in conjunction with screw-thread $e^2$ of lug $c$, is made to force its bevel $g$ into the eye-bevel $d'$ of the thill-iron C, while by screwing up the hollow screw-plug F its screw-thread will draw upon the screw-threads of the lug $c'$, thereby forcing its bevel $g^3$ into the eye-bevel $d^2$ of said thill-iron, thus more or less, as the case may be, clamping the thill-iron tightly between the lugs $c\ c'$ of the clip B, and in which adjusted position said parts are held from casual displacement by the check-nut E. In this manner the wear of the parts as heretofore mentioned is compensated for and rattling prevented, and at the same time a very effective and durable thill-coupling produced, the several parts being held in adjusted position against casual displacement by the large impact bevel area of the convex check-nut E and the concave seat $d^3$ of the hollow screw-plug F, through which plug the body $g'$ of the bolt D is passed free from contact therewith; and it will also be seen that when the adjustment of the bolt D and the screw-plug F is such as to allow the eye $d$ of the thill-iron C to come in contact with and draw upon the body $g'$ of said bolt while the coupling is being drawn upon by the team such draft will, when the convex check-nut E is screwed up into its concave seat $d^3$, cause the body $g'$ of the bolt D to press a portion of the convex surface of the nut E against a corresponding portion of its concave seat $d^3$, and thus secure the check-nut from becoming loose, such action of the draft of the team being permitted by the freedom of the body $g'$ of the bolt D from contact with the screw-plug F. In this manner I secure a given adjustment of all the several parts of the thill-coupling by the use of only one check-nut, and at the same time hold the check-nut to its work by the draft of the team.

What I claim is—

1. The thill-coupling comprising in combination a coupling-bolt D, having a screw-threaded enlarged portion $e'$, and a beveled portion $g$ between its body and enlarged portion, and also a screw-threaded inner end, a screw-threaded plug F, having a beveled inner end $g^3$ and an outer end concave seat $d^3$, a nut E, a clip-iron B, having screw-threaded lugs $c\,c'$, and a thill-iron C, having bevel seats $d'\,d^2$ at the ends of its bolt-eye, substantially as described.

2. The thill-coupling provided with an adjustable hollow screw-threaded wear-compensating plug screwed into the inner lug or ear of the iron, and a bolt provided with a wear-compensation screw-threaded enlargement portion which is adjustable with the bolt and is screwed into the outer lug or ear of the clip-plate or fastening-iron, said bolt also having mainly a plain body portion $g'$ of smaller diameter than the said enlargement portion, which is extended loosely through the hollow wear-compensation plug F, and secured by a single nut, as E, which acts to check the hollow screw-plug F and the bolt D from turning, substantially as described.

3. A thill-coupling which comprises the following elements, to wit: a clip B, a thill-iron C, a bolt D, having its body portion $g'$ passed loosely through the eye of the thill-iron C and also through a screw-plug F, and with the outer end of its body $g'$ screw-threaded to receive thereon a check-nut E, a screw-plug F, constructed with a concave seat, as $d^3$, and a check-nut E, constructed with a conical inner end to fit into the seat $d^3$ of the screw-plug F when the parts are in working condition, whereby the draft of the team on the bolt D will serve to lock the check-nut E in its adjusted position, substantially as described.

In testimony whereof I hereunto affix my signature in presence of two witnesses.

WILLIAM H. GAILOR.

Witnesses:
WALTER P. BUTLER,
WINSOR B. FRENCH.